US012151824B2

United States Patent
Kuppan et al.

(10) Patent No.: US 12,151,824 B2
(45) Date of Patent: Nov. 26, 2024

(54) AIRCRAFT EGRESS SYSTEM

(71) Applicant: Goodrich Corporation, Charlotte, NC (US)

(72) Inventors: Skandan Berikai Kuppan, Karnataka (IN); Jeffrey Martin Werbelow, Phoenix, AZ (US); Satya Swaroop Panda, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 560 days.

(21) Appl. No.: 17/152,952

(22) Filed: Jan. 20, 2021

(65) Prior Publication Data

US 2021/0229820 A1 Jul. 29, 2021

(30) Foreign Application Priority Data

Jan. 24, 2020 (IN) .............................. 202011003302

(51) Int. Cl.
 *B64D 25/14* (2006.01)
 *F04D 17/10* (2006.01)
 (Continued)

(52) U.S. Cl.
 CPC ............. *B64D 25/14* (2013.01); *F04D 17/10* (2013.01); *F04D 25/0673* (2013.01); *F04D 27/008* (2013.01); *F04D 29/4226* (2013.01)

(58) Field of Classification Search
 CPC .... F04D 17/10; F04D 25/0673; F04D 27/008; F04D 29/4226; F04D 19/002; B64D 25/14; F04F 5/20; F05F 5/10
 See application file for complete search history.

(56) References Cited

U.S. PATENT DOCUMENTS

| 4,375,877 A * | 3/1983 | Shorey | B64D 25/14 |
| | | | 193/25 B |
| 9,637,210 B2 * | 5/2017 | Thomson | F04D 17/10 |
| (Continued) | | | |

FOREIGN PATENT DOCUMENTS

| CN | 103043192 A | 4/2013 |
| CN | 207595222 U | 7/2018 |
| CN | 110182337 A | 8/2019 |

OTHER PUBLICATIONS

Compressors, PetroWiki, edited on Jun. 1, 2015, [retrieved on Jan. 7, 2021 (Jan. 7, 2021)]. Retrieved from the Internet:, URL:http://https://petrowiki.spe.org/Compressors#Dynamic_or_kinetic_compressors, 12 pages.

(Continued)

*Primary Examiner* — Charles G Freay
*Assistant Examiner* — Lilya Pekarskaya
(74) *Attorney, Agent, or Firm* — CANTOR COLBURN LLP

(57) ABSTRACT

Disclosed is an egress pack for egressing a craft. The egress pack includes an egress aid defining a cavity and an inflation port. The egress pack includes an inflation duct connected with the inflation port for supplying gas to the cavity. The inflation duct defines a flow direction oriented to supply the cavity. The inflation duct defines a first ingress port defined by a first boundary and defining a primary flow path in the flow direction. The inflation duct defines a second ingress port defining a secondary flow path in fluid communication with the primary flow path. The inflation duct defines a divider disposed between the first ingress port and the second ingress port that coincides with the first boundary.

13 Claims, 8 Drawing Sheets

(51) Int. Cl.
    *F04D 25/06*     (2006.01)
    *F04D 27/00*     (2006.01)
    *F04D 29/42*     (2006.01)

(56) References Cited

U.S. PATENT DOCUMENTS

| | | | |
|---|---|---|---|
| 10,823,205 B2* | 11/2020 | Wang | F04F 5/46 |
| 11,198,514 B2* | 12/2021 | Bahena | F04F 5/463 |
| 2016/0107733 A1 | 4/2016 | Thomson | |
| 2016/0144938 A1 | 5/2016 | Blenkarn et al. | |
| 2019/0010962 A1* | 1/2019 | White | F04F 5/466 |
| 2020/0124057 A1* | 4/2020 | Kuppan | F04F 5/466 |
| 2020/0182364 A1* | 6/2020 | Haynes | F04F 5/16 |
| 2020/0191169 A1* | 6/2020 | Kuppan | F04F 5/16 |

OTHER PUBLICATIONS

Gens ace, [retrieved on Jan. 7, 2021 (Jan. 7, 2021)]. Retrieved from the internet:, URL:https://www.gensace.de/gens-ace-5000mah-60-120c-44-4v-12s1p-lipo-battery-pack.html, 6 pages.

128mm, vasyfan.com [retrieved on Jan. 7, 2021 (Jan. 7, 2021)]. Retrieved from the internet:, URL:https://www.vasyfan.com/en-GB/EDFs#EDF128mm, 11 pages.

* cited by examiner

AIRCRAFT EGRESS SYSTEM

FOREIGN PRIORITY

This application claims priority to Indian application Ser. No. 202011003302 filed Jan. 24, 2020, the entire contents of which is incorporated herein by reference.

BACKGROUND

Aircrafts may be exited using any number of egress systems. For example, stairs, slides, rafts, jet bridges, jetways, airgates, gangways, airbridges, air jettys, portals, skybridges, airtubes, or passenger boarding bridges may be used. Such systems or devices may be buoyant. Egress systems may require inflation. Inflation of egress systems may include pressurizing the system to a particular pressure. Time required for pressurization may be of the essence.

BRIEF DESCRIPTION

Disclosed is an egress pack for egressing a craft. The egress pack includes an egress aid defining a cavity and an inflation port. The egress pack includes an inflation duct connected with the inflation port for supplying gas to the cavity. The inflation duct defines a flow direction oriented to supply the cavity. The inflation duct defines a first ingress port defined by a first boundary and defining a primary flow path in the flow direction. The inflation duct defines a second ingress port defining a secondary flow path in fluid communication with the primary flow path. The inflation duct defines a divider disposed between the first ingress port and the second ingress port that coincides with the first boundary.

In addition to one or more of the features described above, or as an alternative, further embodiments may include that the inflation duct defines an axis and the inflation duct further comprises a first duct elongated along the axis and joined with the first ingress port.

In addition to one or more of the features described above, or as an alternative, further embodiments may include a prime mover disposed in the first duct operable to move a first gaseous matter from the first duct through the first ingress port and entrain gaseous matter from the second ingress port.

In addition to one or more of the features described above, or as an alternative, further embodiments may include that the prime mover is an electric machine associated with a compressor having blades.

In addition to one or more of the features described above, or as an alternative, further embodiments may include a battery operable to power the electric machine.

In addition to one or more of the features described above, or as an alternative, further embodiments may include a first check valve disposed on the inflation duct configured to permit flow of the first gaseous matter in the flow direction and resist the flow of the first gaseous matter opposite the flow direction.

In addition to one or more of the features described above, or as an alternative, further embodiments may include that the first check valve comprises a butterfly stem disposed across the first duct and a butterfly disk sized to fill a cross-section of the first duct.

In addition to one or more of the features described above, or as an alternative, further embodiments may include that the butterfly disk defines a first section and a second section having a first position to form the butterfly disk and a second position to join the first section and the second section and form a half disk.

In addition to one or more of the features described above, or as an alternative, further embodiments may include that the first duct forms the divider.

In addition to one or more of the features described above, or as an alternative, further embodiments may include that the first ingress port and the second ingress port are centered on the axis and the second ingress port circumscribes the first ingress port.

In addition to one or more of the features described above, or as an alternative, further embodiments may include a second check valve disposed on the inflation duct configured to permit flow of a second gaseous matter in the flow direction and resist the flow of the second gaseous matter opposite the flow direction.

In addition to one or more of the features described above, or as an alternative, further embodiments may include that the second ingress port is defined with a substantially rectangular cross-section having sides and defining stanchions formed with the first boundary and the second check valve comprises flaps that define a valve head and the stanchions define a seat of the valve head.

In addition to one or more of the features described above, or as an alternative, further embodiments may include that the second check valve comprises flap stems defined along the sides and the flaps are operable to rotate on the flap stems.

Also disclosed is a method for inflating a cavity of an egress aid of a craft. The method includes operating a prime mover to move a first gaseous matter through a first ingress port of an inflation duct to an inflation port. The method includes entraining a second gaseous matter from a second ingress port of the inflation duct with the first gaseous matter. The method includes inflating the cavity with the first gaseous matter and the second gaseous matter. The method includes obstructing the first ingress port and the second ingress port with backpressure from the cavity.

In addition to one or more of the features described above, or as an alternative, further embodiments may include that the obstructing the first ingress port is by a first check valve operated with the backpressure.

In addition to one or more of the features described above, or as an alternative, further embodiments may include that the obstructing the second ingress port is by a second check valve operated with the backpressure.

In addition to one or more of the features described above, or as an alternative, further embodiments may include packaging the egress aid with the prime mover and the inflation duct for storage on the craft.

Also disclosed is an inflation duct for an egress pack. The inflation duct includes a housing. The housing defines an inflation port. The housing defines an axis. The housing defines a flow direction oriented to the inflation port. The housing defines a first ingress port defined by a first boundary and defining a primary flow path with the flow direction. The housing defines a second ingress port defined by a second boundary and defining a secondary flow path in fluid communication with the primary flow path. The housing defines a first duct elongated along the axis and joined with the first ingress port on the first boundary as a divider between the first ingress port and the second ingress port.

In addition to one or more of the features described above, or as an alternative, further embodiments may include a stanchion disposed between the first boundary and the second boundary collectively defining a second check valve housing between the first boundary and the second boundary.

In addition to one or more of the features described above, or as an alternative, further embodiments may include that the second check valve housing has sides that define a seat and comprising flaps protruding from the sides that define a valve head configured to meet the seat to form a second check valve.

BRIEF DESCRIPTION OF THE DRAWINGS

The following descriptions should not be considered limiting in any way. With reference to the accompanying drawings.

DETAILED DESCRIPTION

A detailed description of one or more embodiments of the disclosed apparatus and method are presented herein by way of exemplification and not limitation with reference to the Figures.

Figure 1:
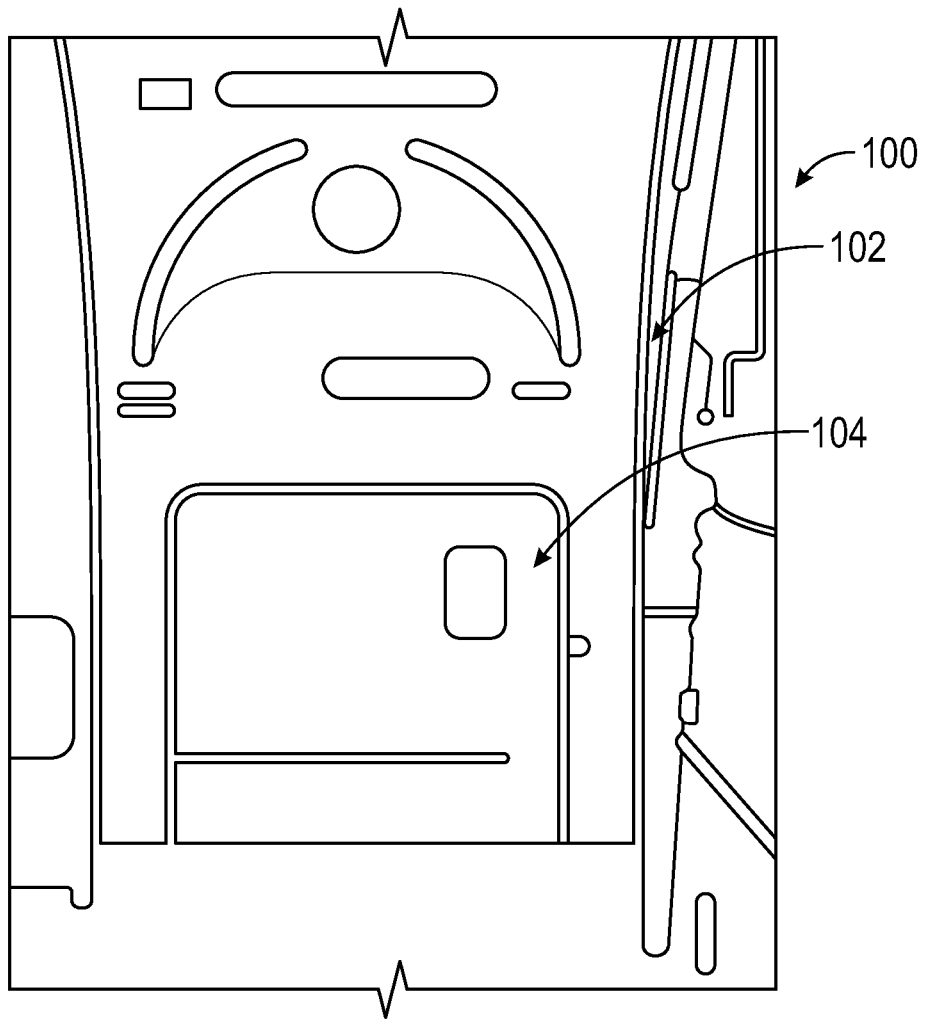
FIG. 1 illustrates a craft having an egress pack.

Referring to FIG. 1, a portion of a craft 100 is shown. The craft 100 may be of any kind. As an example, the craft 100 may be an aircraft. The craft 100 may have an exit opening 102. The exit opening 102 may be secured by a door, a hatch, or another type of operable seal. The door or hatch may include an egress pack 104. The egress pack 104 may be part of the door or disposed near the door. The egress pack 104 may be operable to actuate or extend based on circumstances of the craft 100. The egress pack 104 may be compressed.

Figure 2:
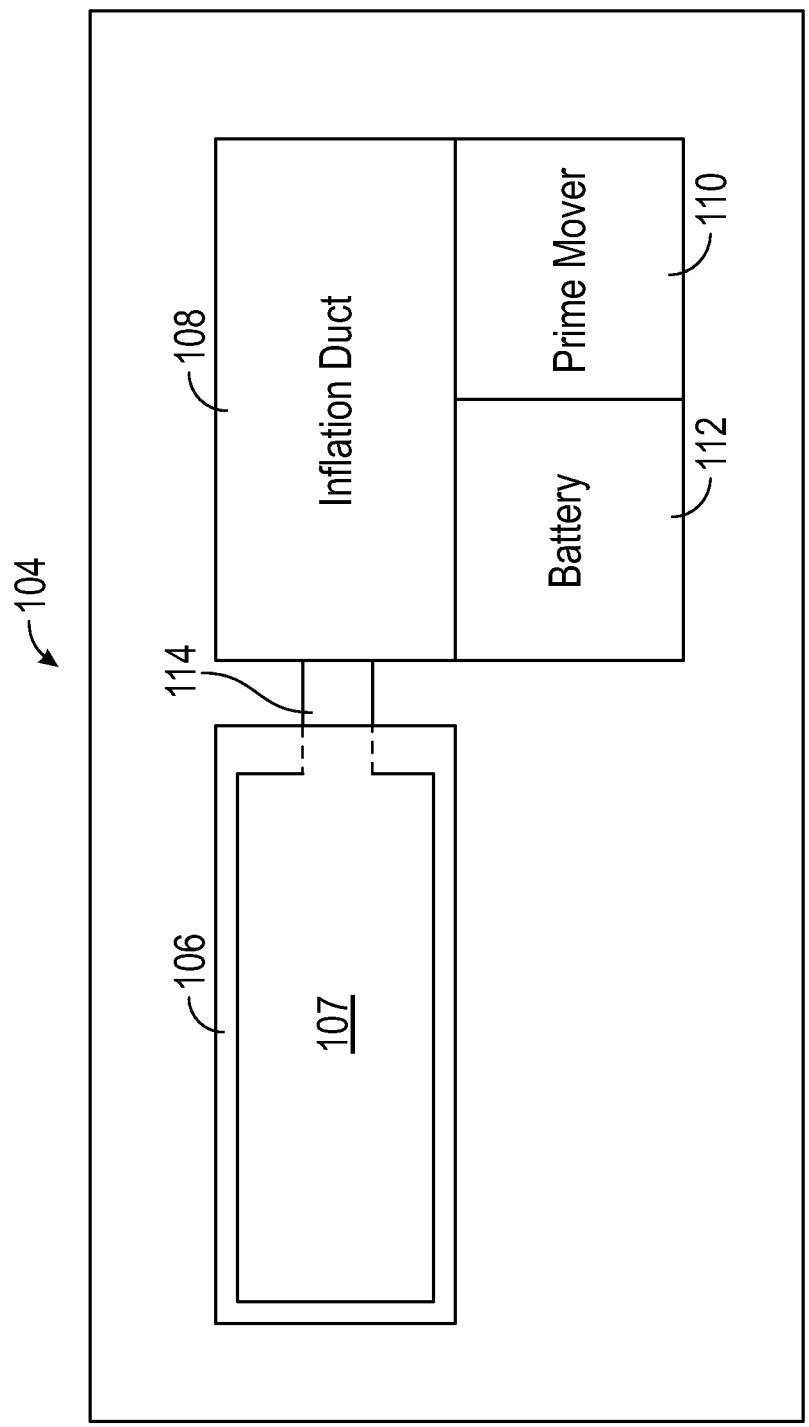
FIG. 2 illustrates an egress pack having an egress aid and an inflation duct.

Turning to FIG. 2, the egress pack 104 is shown. The egress pack 104 includes an egress aid 106. The egress aid 106 may be inflatable. That is, the egress aid 106 may have a cavity 107. The cavity 107 may be defined by the egress aid 106. The egress aid 106 comprises a shell surrounding and defining the cavity 107. It should be appreciated that any number of shells or compartments may be defined by the egress aid 106. The egress aid 106 may be or comprise any number of shell or bladder objects operable to inflate.

The egress aid 106 may be attached to an inflation duct 108 by an inflation port 114. The inflation port 114 may be defined on the egress aid 106, the inflation duct 108, or a combination of the egress aid 106 and the inflation duct 108. That is, the inflation port 114 may be a plane defined between the inflation duct 108 and the egress aid 106 that enables the passage of gaseous matter. The inflation port 114 may be defined as an orifice on the egress aid 106 or the inflation duct 108. The inflation port 114 may have any shape.

The inflation duct 108 may include or be associated with a prime mover 110 and a battery 112. The battery 112 may be any type, including Lithium polymer, ultracapacitors, and supercapacitors. The prime mover 110 may be any type implemented for moving fluid matter. As an example, the prime mover 110 may be an electric machine 138 with a compressor 134 or fan having blades. It should be appreciated that the electric machine 138 may be any other type of machinery operable to provide motive force. Additionally, any other type of machinery for moving air may be implemented.

Figure 3A:
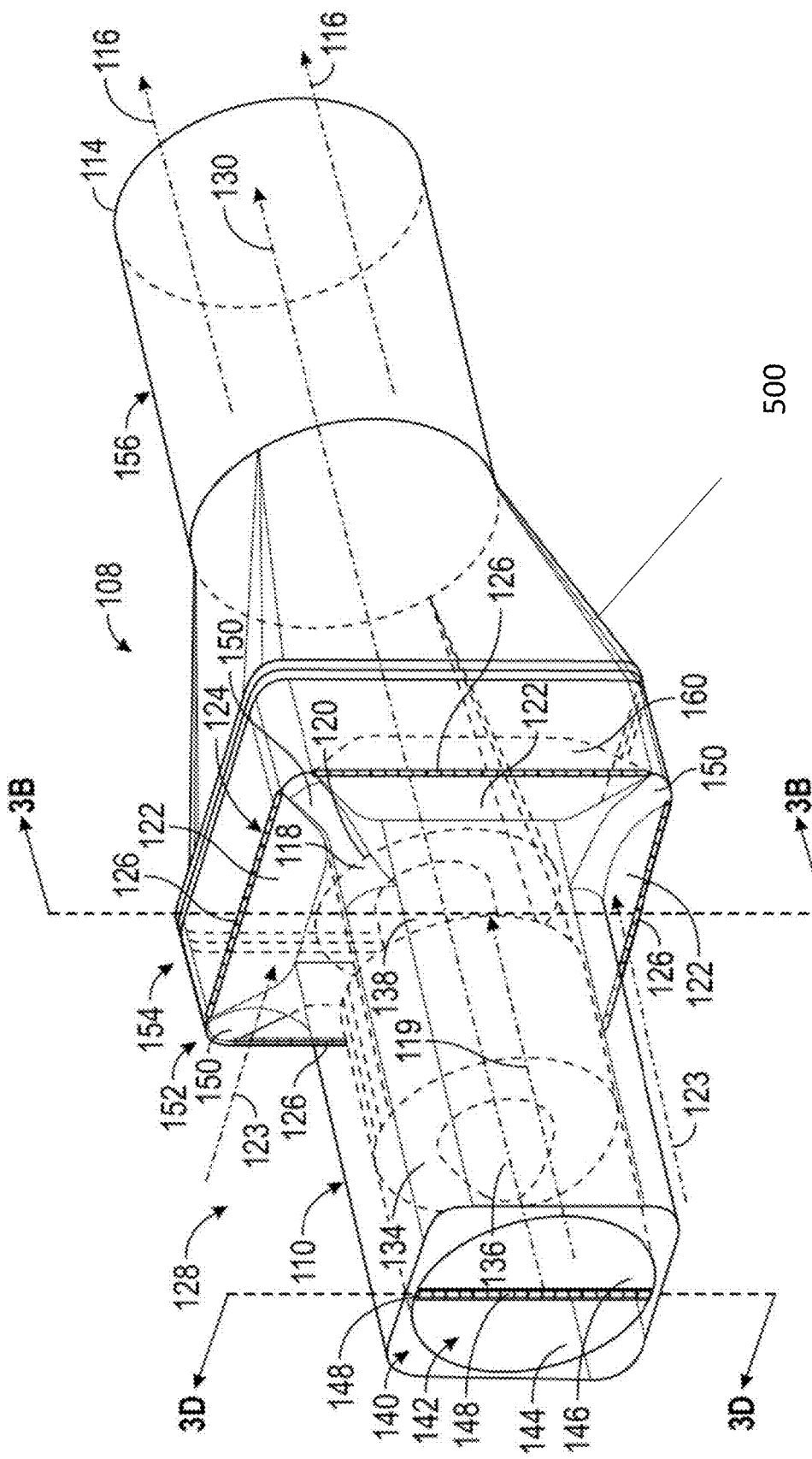
FIG. 3A illustrates an isometric view of an inflation duct.

Moving to FIGS. 3A-3D and starting with FIG. 3A, the inflation duct 108 is shown. The inflation duct 108 may be an assembled part. The inflation duct 108 may include a housing 500 that is unitary. The inflation duct 108 may be molded to form the unitary housing. The inflation duct 108 defines a flow direction 116 of gaseous matter to the cavity 107 of the egress aid 106. The inflation duct 108 may be associated with an axis 130. The inflation duct 108 may be elongated along an axis 130.

Figure 3B:
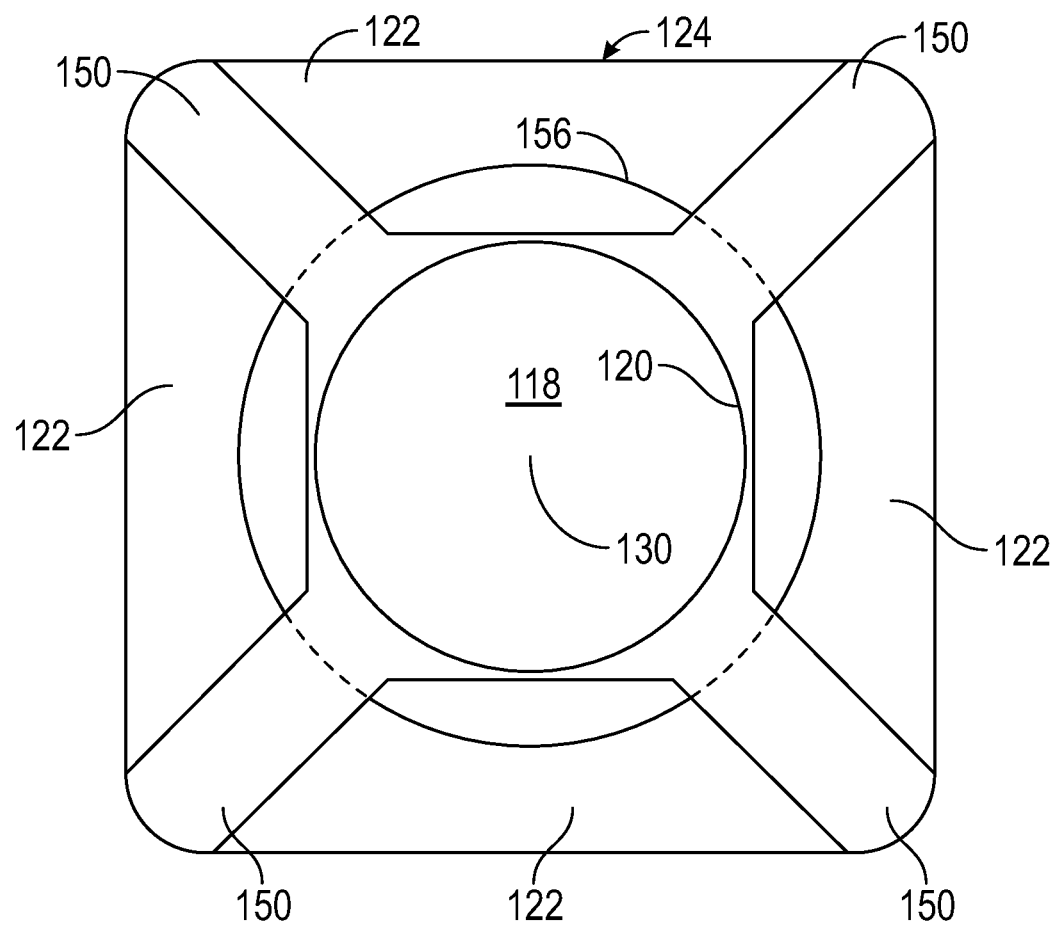
FIG. 3B illustrates a cross-sectional view of a first ingress port and a second ingress port.

As shown in more detail with cross-section FIG. 3B, the inflation duct 108 includes a first ingress port 118 and a second ingress port 122. It should be appreciated that the first ingress port 118 and the second ingress port 122 may take any shape. The first ingress port 118 and the second ingress port 122 may be planar or multi-dimensional. The first ingress port 118 defines a primary flow path 119. The first ingress port 118 may be defined by a first boundary 120. The second ingress port 122 defines a secondary flow path 123. The second ingress port 122 may be defined by a second boundary 124. The first boundary 120 may be or coincide with a divider between the first ingress port 118 and the second ingress port 122. A first gaseous matter may be associated with the first ingress port 118 and a second gaseous matter may be associated with the second ingress port 122. The first ingress port 118 and the second ingress port 122 may draw air from the same reservoir or volume inside or outside the craft 100, as the first gaseous matter is defined by passing through the first ingress port 118 and the second gaseous matter is defined by passing through the second ingress port 122.

The first boundary 120 may define a perimeter of a first duct 128. The first duct 128 may extend away from the inflation port 114 along the axis 130. The first duct 128 may have a circular or ovate footprint. The first duct 128 may terminate at the first boundary 120 or extend beyond the first boundary 120 to create an orifice associated with the first duct 128. The first duct 128 may include a first check valve 140. The first check valve 140 is configured to obstruct a cross-section of the first duct 128 shown as obstructed by a butterfly disk 142. The butterfly disk 142 may include a first section 144 and a second section 146. The first section 144 and the second section 146 may be configured to orient about a butterfly stem 148. The butterfly stem 148 may be oriented across a major diameter of the cross-section of the first duct 128. The butterfly stem 148 may operate as a hinge for the first section 144 and the second section 146. As an example, the first section 144 may be hinged to the butterfly stem 148 on an upper half of the butterfly stem 148, and the second section 146 may be hinged to the butterfly stem 148 on a lower half of the butterfly stem 148.

As such, the first check valve 140 may be configured to permit flow of the first gaseous matter in the flow direction 116 through the primary flow path 119. The first check valve 140 may be configured to resist flow of the first gaseous matter opposite the flow direction 116. As an example, the first section 144 and the second section 146 may have a first position, as shown in FIG. 3A, that forms the butterfly disk 142 to resist flow opposite the flow direction 116. As shown in more detail in FIG. 3D, the butterfly disk 142 may be hinged or otherwise bent in half to permit flow of the first gaseous matter in the flow direction 116. As shown in FIG.

3D, the first section 144 and the second section 146 form a half disk in a second position. It should be appreciated that any mechanism may be used to bias the first section 144 and the second section 146 to form the butterfly disk 142. As an example, backpressure may be used to drive the first section 144 and the second section 146 into the butterfly disk 142. The first section 144 and the second section 146 may include a catch, a seal, or another mechanism to prevent hinging in the opposite direction. Natural biasing of the butterfly disk 142 materials (e.g., elastic materials) may cause the first section 144 and the second section 146 to hinge back to form the butterfly disk 142. As another example, a biasing member such as a spring or elastic member may be used to bias the first section 144 and the second section 146.

As mentioned, the inflation duct 108 may be associated with a prime mover 110 and a battery 112. The prime mover 110 may be disposed offboard the inflation duct 108. The prime mover 110 may be disposed onboard the inflation duct 108. The prime mover 110 may be associated with first duct 128. The prime mover 110 may be disposed within the first duct 128. The prime mover 110 may be disposed coaxial with the axis 130. The prime mover 110 may include an electric machine 138. The electric machine 138 may be any type. The electric machine 138 may be driven by direct current from battery 112. The prime mover 110 may include a compressor 134 or fan. Any implement that converts rotational energy from the electric machine 138 to linear movement of gaseous matter through the inflation duct may be used. The prime mover 110 may include an aerodynamic cone 136.

Figure 3C:
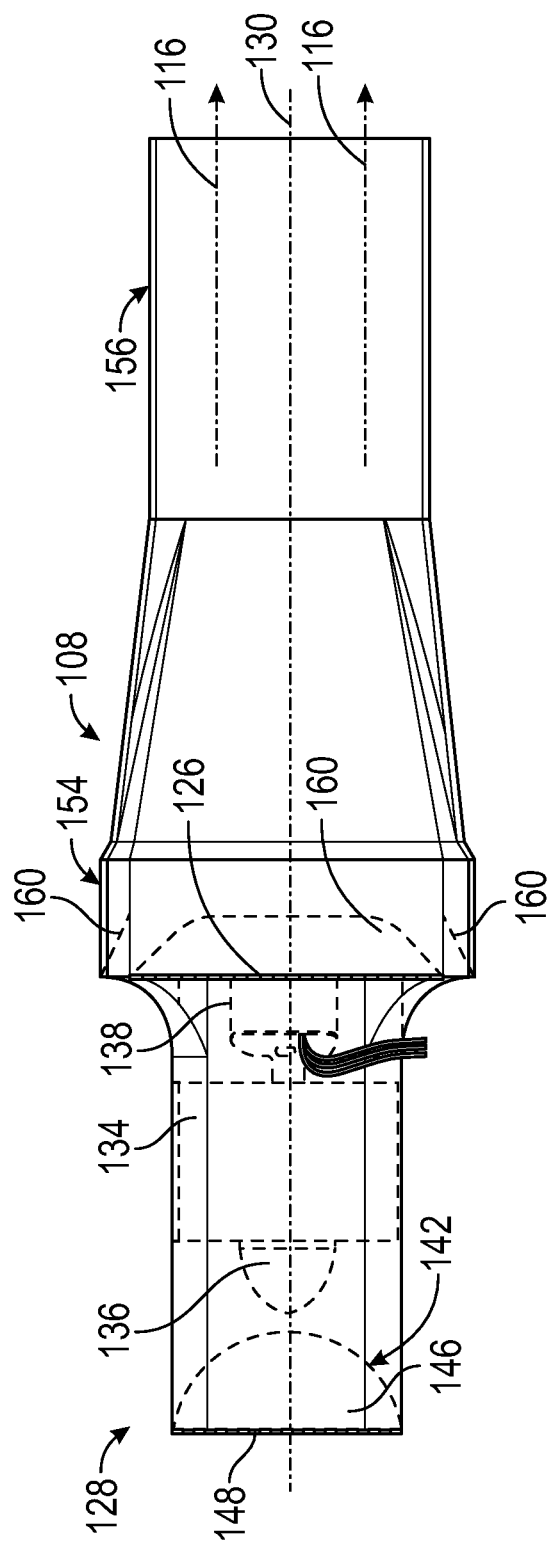
FIG. 3C illustrates a side view of an inflation duct.
Figure 3D:
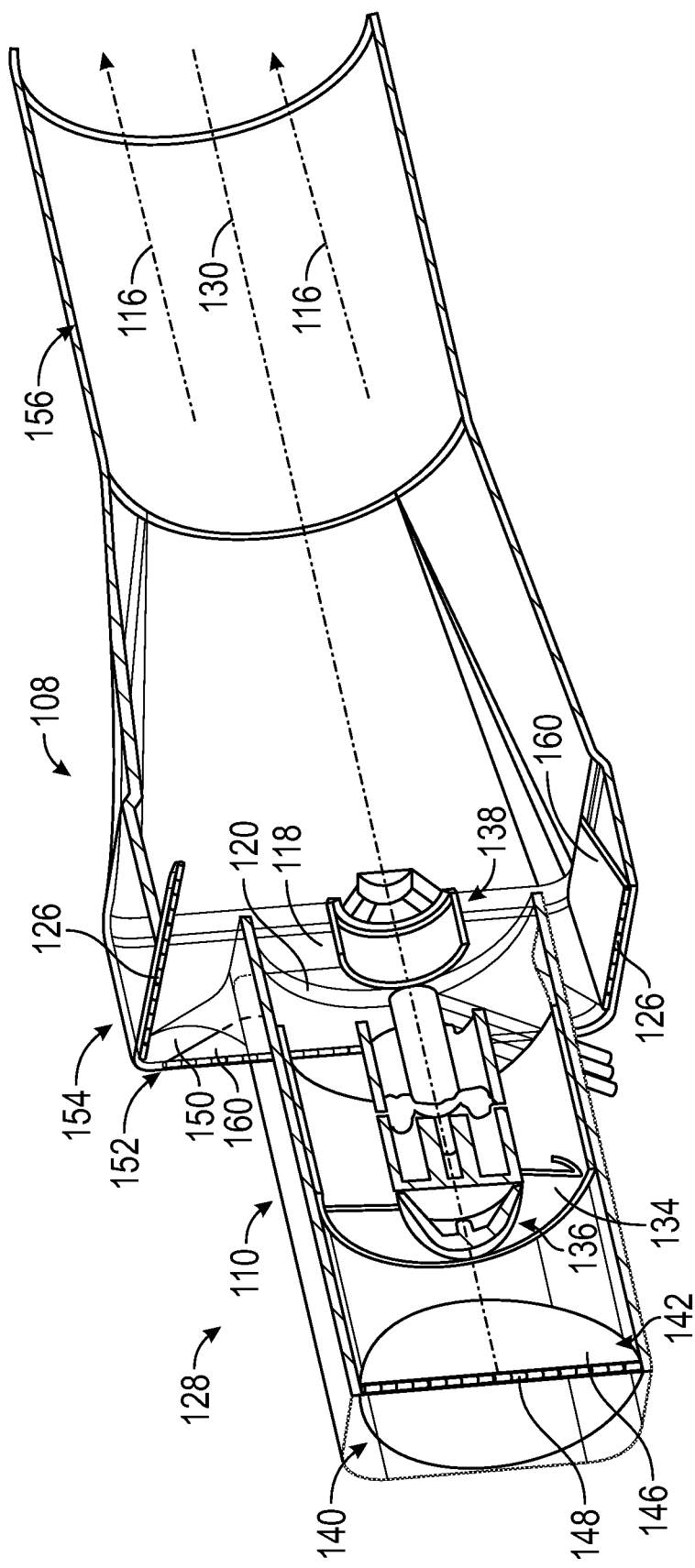
FIG. 3D illustrates a cross-sectional view of an inflation duct.

The second ingress port 122 may be associated with a second check valve 152. The second check valve 152 may be configured to permit flow of a second gaseous matter in the flow direction 116. The second check valve 152 may be configured to resist flow of a second gaseous matter opposite the flow direction 116. The second ingress port 122 may be defined by a second boundary 124. The second boundary 124 may have a rectangular or substantially rectangular cross-section. That is, the second boundary 124 may have fileted corners or other irregularities. The second check valve 152 may comprise various check mechanisms. As an example, the check mechanisms may be flaps 160 as shown in FIG. 3C. The flaps 160 are operable to hinge on flap stems 126 on the sides of the second boundary 124. The flap stems 126 may be disposed on the perimeter of the second boundary 124. Stanchions 150 may be used to support the second check valve 152 and define a second check valve housing 154. The flaps 160 may define a valve head of the second check valve 152. The stanchions 150 may define a valve seat of the second check valve 152 such that when the second check valve 152 resists flow the flaps 160 rest on the stanchions 150 and other supportive material of the second check valve housing 154.

The second check valve housing 154 may be tapered to join an outlet 156 of inflation duct 108 associated with inflation port 114. The second check valve housing 154 may include supports to prevent compression of the second check valve housing 154. It should be appreciated that the second check valve 152 may be any size or shape. The second ingress port 122 may partially or fully surround the first ingress port 118.

Figure 4:
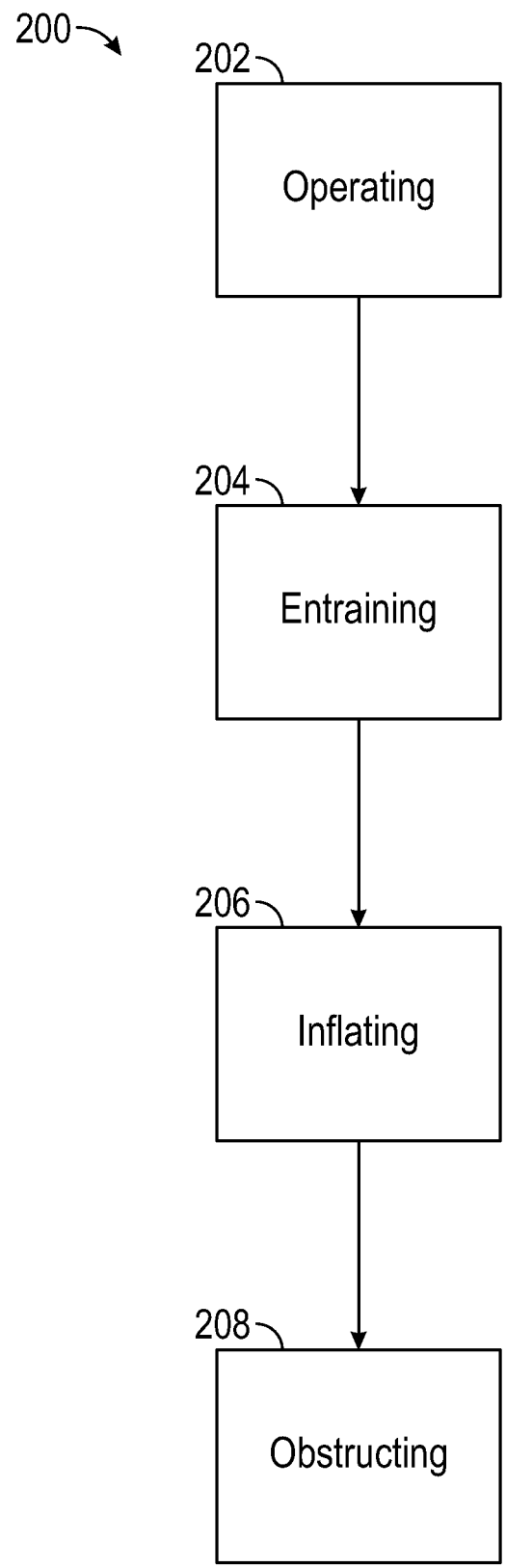
FIG. 4 illustrates a method for implementing portions of this disclosure.

Referring to FIG. 4, a method 200 is shown. The method 200 includes a step-by-step process for implementing portions of this disclosure. The steps may be omitted, reordered, duplicated, or otherwise rearranged in any way. Additional steps may be added to the process. The steps may be performed in sequentially or simultaneously.

The method 200 may be used to inflate a cavity 107 of an egress aid 106. The egress aid 106 may be associated with a craft 100. The method 200 may include opening a door or hatch associated with exit 102 of the craft 100. The door may be automatically actuated based on circumstance. After, or while, the door is opened, the prime mover 110 may be operated to move first gaseous matter through a first ingress port 118 of an inflation duct 108 to an inflation port 114 in step 202. As an example, the first gaseous matter may be environmental air surrounding the first ingress port 118 or the inflation duct 108. The first gaseous matter may also be stored in a reservoir. In step 204, a second gaseous matter is entrained from the second ingress port 122 with the first gaseous matter. That is, the force of the first gaseous matter, or high exit velocity of the first gaseous matter, through the inflation duct 108 creates a low pressure region near the second ingress port 122. As such, suction is formed in the flow direction 116 that draws the second gaseous matter into the inflation duct 108 to the inflation port 114. As such, additional mass is deposited in the egress aid 106, decreasing the time required for the egress aid 106 to become inflated. In some implementations there may be a 25% increase in the mass deposited in the egress aid 106 during inflation. Removal of compressed gas systems may further decrease the overall weight of the egress pack 104 by 66%. As an example, as the first gaseous matter exits the prime mover 110, the velocity may be 100-150 m/s. As the static pressure decreases the second gaseous matter is entrained.

In step 206, the cavity 107 is inflated with the first gaseous matter and the entrained second gaseous matter. The cavity 107 may be inflated to four psig. In step 208, the first ingress port 118 and the second ingress port 122 are obstructed using backpressure from the cavity 107 to close check valves. The location of the obstruction may be anywhere along the inflation duct 108. As an example, the first ingress port 118 may be obstructed with the first check valve 140. The second ingress port 122 may be obstructed with the second check valve 152. The first check valve 140 and the second check valve 152 may be biased so that the backpressure from the inflated egress aid 106 closes the first check valve 140 and the second check valve 152. As an example, flow of matter opposite the flow direction 116 may cause the flaps 160 to seat against the stanchions 150 and other housing material of the second check valve 152, resisting flow.

It should be appreciated that the structure of the inflation duct 108 disclosed herein may allow for proper packaging of the egress aid 106 with the inflation duct 108 with the prime mover 110 and battery 112 within the egress pack 104 to provide a self-contained system. As such, inflation duct 108 is designed to reduce compressibility and snagging.

Figure 5:
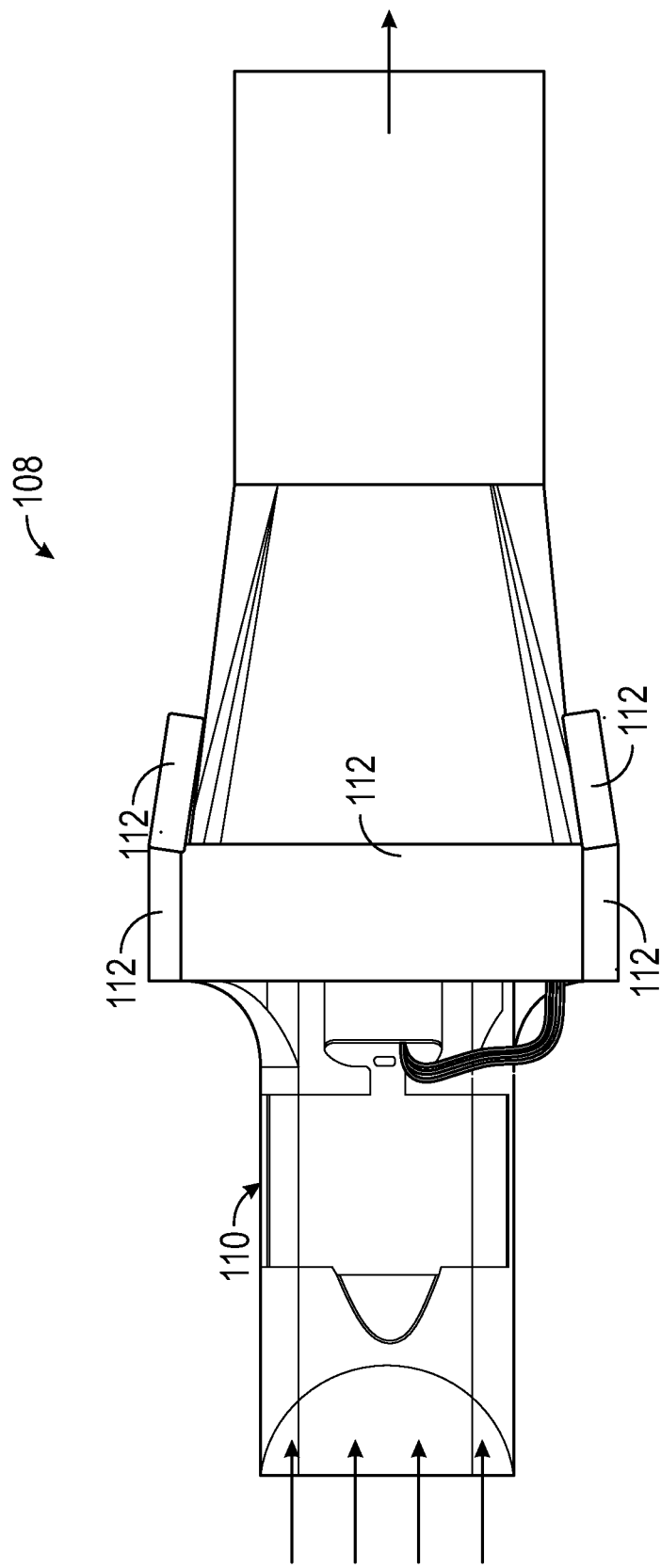
FIG. 5 illustrates a unitary battery pack and inflation duct.

Referring to FIG. 5, inflation duct 108, the battery 112 and the prime mover 110 may be unitary. As shown in one implementation, the battery 112 may surround the inflation duct 108 and the prime mover 110 may be disposed within the inflation duct 108. The battery 112 may reinforce the second check valve housing 154 and taper defined by the inflation duct 108 to reinforce the inflation duct 108 while under compressive loads in the egress pack 104.

The terminology used herein is for ti\\he purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An egress pack for egressing a craft, the egress pack comprising: an egress aid defining a cavity and an inflation port; and an inflation duct connected with the inflation port for supplying gas to the cavity, the inflation duct defining:
   an axis;
   a flow direction oriented to supply the cavity;
   a first ingress port defined by a first boundary and defining a primary flow path in the flow direction; a second ingress port defining a secondary flow path in fluid communication with the primary flow path;
   a divider disposed between the first ingress port and the second ingress port that coincides with the first boundary;
   a first duct elongated along the axis and joined with the first ingress port;
   a first check valve configured to permit a flow of a first gaseous matter in the flow direction through the first ingress port;
   a second check valve disposed on the inflation duct configured to permit a flow of a second gaseous matter in the flow direction and resist the flow of the second gaseous matter opposite the flow direction, wherein the second ingress port defines stanchions formed with the first boundary, wherein the second check valve comprises flaps that define a valve head, and wherein the stanchions define a seat of the valve head.

2. The egress pack of claim 1, further comprising a prime mover disposed in the first duct operable to move the first gaseous matter from the first duct through the first ingress port and entrain the second gaseous matter from the second ingress port.

3. The egress pack of claim 2, wherein the prime mover is an electric machine associated with a compressor having blades.

4. The egress pack of claim 3, further comprising a battery operable to power the electric machine.

5. The egress pack of claim 2, wherein the first check valve is configured to resist the flow of the first gaseous matter opposite the flow direction.

6. The egress pack of claim 5, wherein the first check valve comprises a butterfly stem disposed across the first duct and a butterfly disk sized to fill a cross-section of the first duct.

7. The egress pack of claim 6, wherein the butterfly disk defines a first section and a second section having a first position to form the butterfly disk and a second position to join the first section and the second section and form a half disk.

8. The egress pack of claim 1, wherein the first duct forms the divider.

9. The egress pack of claim 1, wherein the first ingress port and the second ingress port are centered on the axis and the second ingress port circumscribes the first ingress port.

10. The egress pack of claim 1, wherein the second ingress port is defined by a rectangular or substantially rectangular cross-section having sides.

11. The egress pack of claim 10, wherein the second check valve comprises flap stems that are defined along the sides of the second ingress port and the flaps are operable to rotate on the flap stems.

12. An inflation duct for an egress pack, the inflation duct comprising:
   a housing defining:
      an inflation port;
      an axis;
      a flow direction oriented to the inflation port;
      a first ingress port defined by a first boundary and defining a primary flow path with the flow direction;
      a second ingress port defined by a second boundary and defining a secondary flow path in fluid communication with the primary flow path;
      a first duct elongated along the axis and joined with the first ingress port on the first boundary as a divider between the first ingress port and the second ingress port;
      a stanchion that is disposed between the first boundary and the second boundary and collectively defining a check valve housing between the first boundary and the second boundary.

13. The inflation duct for as the egress pack egress pack of claim 12, wherein the check valve housing has sides that define a seat and comprising flaps protruding from the sides that define a valve head that is configured to meet the seat to form the check valve.

* * * * *